(12) United States Patent
Doddameti et al.

(10) Patent No.: US 11,934,306 B2
(45) Date of Patent: Mar. 19, 2024

(54) OBJECT STORAGE CHANGE-EVENTS

(71) Applicant: Microsoft Technology Licensing, LLC, Redmond, WA (US)

(72) Inventors: Sandesh Ashok Doddameti, Seattle, WA (US); Himanshu Gupta, Seattle, WA (US); Jegan Devaraju, Redmond, WA (US); Maneesh Sah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 17/866,287

(22) Filed: Jul. 15, 2022

(65) Prior Publication Data
US 2022/0350736 A1 Nov. 3, 2022

Related U.S. Application Data

(62) Division of application No. 16/507,208, filed on Jul. 10, 2019, now Pat. No. 11,436,139.

(60) Provisional application No. 62/846,371, filed on May 10, 2019.

(51) Int. Cl.
G06F 12/02 (2006.01)
G06F 16/23 (2019.01)
G06F 16/901 (2019.01)

(52) U.S. Cl.
CPC ...... *G06F 12/0253* (2013.01); *G06F 16/2358* (2019.01); *G06F 16/9027* (2019.01)

(58) Field of Classification Search
CPC ............. G06F 16/2358; G06F 16/9027; G06F 12/0253
See application file for complete search history.

(56) References Cited

U.S. PATENT DOCUMENTS

2015/0281355 A1* 10/2015 Maturana ................ G06F 9/548
709/202
2019/0370365 A1* 12/2019 Chalakov .............. G06F 16/176

\* cited by examiner

*Primary Examiner* — Loc Tran
(74) *Attorney, Agent, or Firm* — Workman Nydegger

(57) ABSTRACT

Described herein is a system and method for an append-only block-oriented object storage system. An unstructured storage object is stored in cloud storage. A block is data is received, from a client, to append to the unstructured storage object. A universally unique identifier of the client, and client contextual information regarding the block of data, are received from the client. The client contextual information comprises an identifier of a most recently appended block from the client. When the identifier of the most recently appended block from the client matches a stored identifier associated with the universally unique identifier of the client, the block of data is appended to the unstructured storage object, and the stored identifier associated with the universally unique identifier of the client is updated in accordance with the received client contextual information.

15 Claims, 8 Drawing Sheets

Logical GetSegmentsForAccount(X) -> [1,2,3,4,5,6]

OBJECT STORAGE CHANGE-EVENTS

RELATED APPLICATIONS

This application is a divisional of U.S. application Ser. No. 16/507,208, filed Jul. 10, 2019, entitled "Object Storage Change-Events", which application claims priority to U.S. Provisional Application No. 62/846,371, filed May 10, 2019, entitled "Object Storage Change-Events", the disclosures of which are hereby incorporated by reference herein in their entireties.

BACKGROUND

Cloud storage enables data to be stored on the Internet at a remote site rather than, or in addition to, storing data on-premises. Cloud storage typically refers to an object storage service or system. In some cases, cloud storage may offer a massively scalable object storage system for data objects, a file system service for the cloud, a messaging store for reliable messaging, and the like. Redundancy within cloud storage may ensure that data is safe in the event of transient hardware failures. Further, data may be replicated across datacenters or geographical regions of the cloud storage for additional protection.

For providers, cloud storage may include a multi-tenant environment which stores many objects (e.g., hundreds, thousands, millions, etc.) within the object storage system. For example, objects may be used to store files, images, documents, and the like, in an unstructured format. Objects may be updated by users, software, and systems, with authorized access to such objects. In this environment, it may be beneficial for a client to understand what and how their data is being accessed. However, when changes are made to an object, the only indicator is typically in the form of a timestamp which identifies a point in time at which the object was most recently modified or added. The timestamp does not provide any context about the object. Furthermore, for the user to view the timestamp information the user often has to access a storage file/container and view objects on a line-byline basis to locate an identifier of the desired object.

SUMMARY

In some aspects, the techniques described herein relate to a system, including: a processor; and a memory having computer-executable instructions stored thereupon which, when executed by the processor, cause the system to: store an unstructured storage object stored in cloud storage; receive, from a client, a block of data to append to the unstructured storage object; receive a universally unique identifier of the client, and client contextual information regarding the block of data, the client contextual information including an identifier of a most recently appended block from the client; and when the identifier of the most recently appended block from the client matches a stored identifier associated with the universally unique identifier of the client, append the block of data to the unstructured storage object and update the stored identifier associated with the universally unique identifier of the client in accordance with the received client contextual information.

In some aspects, the techniques described herein relate to a method, including: storing an unstructured storage object stored in cloud storage; receiving, from a client, a block of data to append to the unstructured storage object; receiving a universally unique identifier of the client, and client contextual information regarding the block of data, the client contextual information including an identifier of a most recently appended block from the client; and when the identifier of the most recently appended block from the client matches a stored identifier associated with the universally unique identifier of the client, appending the block of data to the unstructured storage object and updating the stored identifier associated with the universally unique identifier of the client in accordance with the received client contextual information.

In some aspects, the techniques described herein relate to a computer storage media storing computer-readable instructions that, when executed, cause a computing device to: store an unstructured storage object stored in cloud storage; receive, from a client, a block of data to append to the unstructured storage object; receive a universally unique identifier of the client, and client contextual information regarding the block of data, the client contextual information including an identifier of a most recently appended block from the client; and when the identifier of the most recently appended block from the client matches a stored identifier associated with the universally unique identifier of the client, append the block of data to the unstructured storage object and update the stored identifier associated with the universally unique identifier of the client in accordance with the received client contextual information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
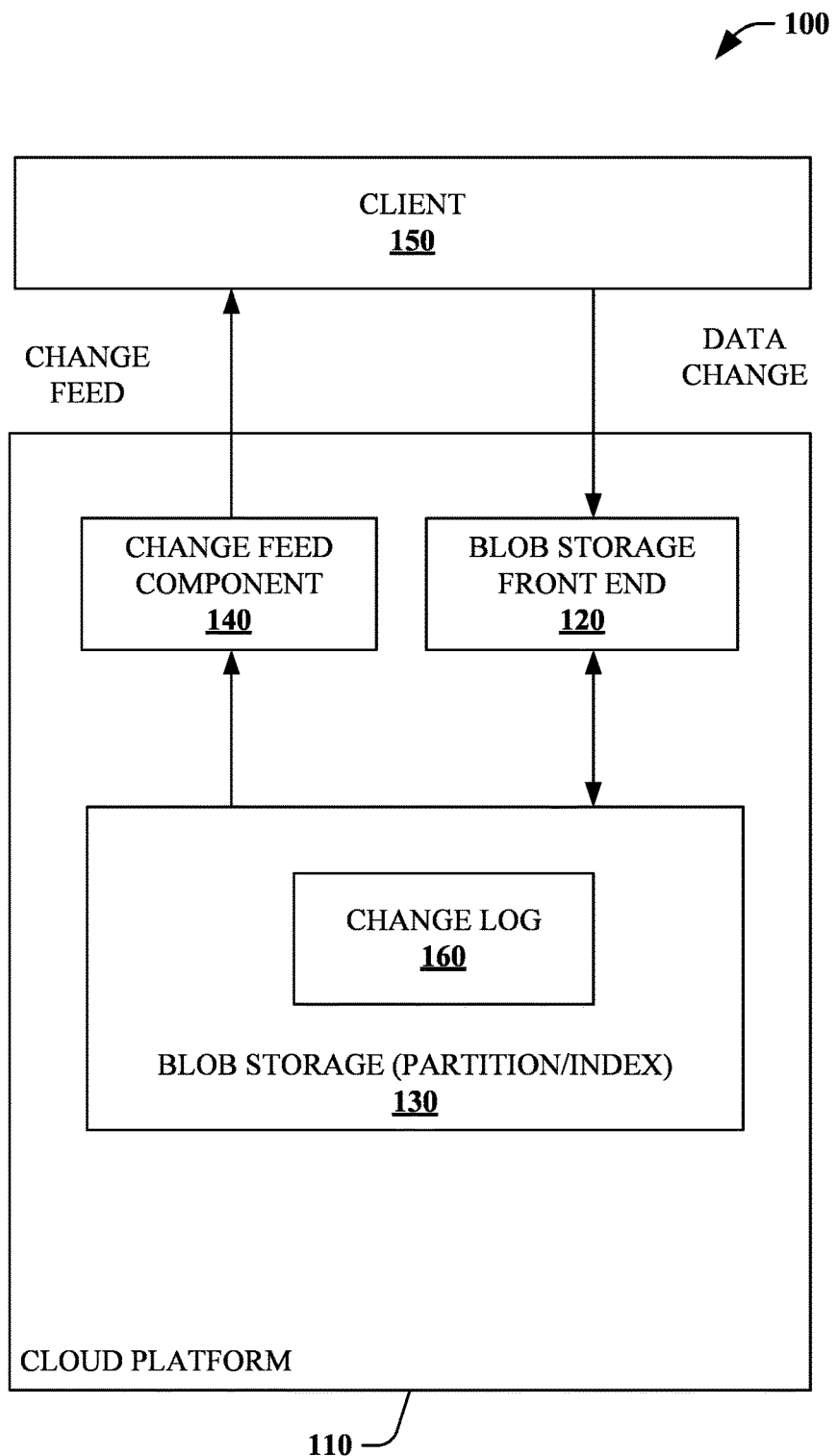
FIG. 1 is a functional block diagram that illustrates a user accessible log of object storage change-events system.

Various technologies pertaining to object storage change-events are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components.

Similarly, for instance, a component may be configured to perform functionality that is described as being carried out by multiple components.

The subject disclosure supports various products and processes that perform, or are configured to perform, various actions regarding object storage change-events. What follows are one or more exemplary systems and methods.

Aspects of the subject disclosure pertain to the technical problem of object storage change log(s). The technical features associated with addressing this problem involve detecting a change within a cloud storage based on an unstructured storage object stored in the cloud storage; identifying contextual attributes of the change from an updated state of the log file that stores information about the unstructured storage object; and providing an output based, at least in part, upon the detected change and at least some of the contextual attributes, wherein the output is an immutable, read-only log of change events. Accordingly, aspects of these technical features exhibit technical effects of more efficiently and effectively storing data, for example, reducing consumption of computing resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Immutable, Read-Only Log of Change-Events

Conventionally, cloud based object storage systems do not provide a durable log of changes happing to the object space. The system and method described herein expose a log of changes, for example, to a user.

Referring to FIG. 1, a user accessible log of object storage change-events system 100 is illustrated. In some embodiments, the object storage is a blob storage. Blobs enable retention of large amounts of unstructured data and typically include the data itself, metadata of the data, one or more identifiers of the blob, and the like.

The system 100 includes a cloud platform 110 which may implement the blob storage system. The cloud platform 110 includes a blob storage front end 120, a storage 130 (also referred to as a partition layer) which can include partition(s) of storage for storing blobs, files, tables, and the like, and a change feed component 140. A client 150 may modify data stored within the storage 130. For example, the client 150 may add a new blob, modify/change an existing blob, delete a blob, and the like, via a request that is sent to the blob storage front end 120. In response, the blob storage front end 120 may trigger a requested change to a blob stored within the storage 130.

Changes to, deletions, and additions within the storage 130 may be recorded within a change log 160 which may also be stored within the partition layer. Changes may be stored as events which identify a location of the blob within the partition layer of the storage 130, an account associated with the blob being changed, a timestamp of the change, metadata of the change, context of the change, and/or the like.

The change log 160 can include contextual attributes of the change to the object from an updated state of the log file that stores information about the unstructured storage object. The contextual attributes may identify a type of change, an account or user associated with the change, an updated storage location of the object within a partition of the storage, a chronological order of the change with respect to other changes, and the like. For example, the change log 160 may include an append-only log file that stores a chronological order of changes to blobs within a multi-tenant blob storage which are detected from the blob storage. The change log 160 may include an identification of a location of the blob storage within a partition layer, an account associated with the blob, an event type of the change, a timestamp of the change, metadata further describing the change, and the like.

The changes stored within the change log 160 may be accessible (read) by the change feed component 140 on-demand and/or at intervals. In some embodiments, each detected change to a blob may cause the change feed component 140 to generate a notification. In some embodiments, changes to one or more blobs may be accrued over time and transmitted.

Large scale, multi-tenant, object storage cloud services provide means to create, update, delete byte-objects and their associated metadata. The system 100 can expose user-initiated and/or system-initiated changes/mutations as an ordered log of events (per-key) for user consumption to facilitate various batch-processing and/or stream-processing use-cases.

In some embodiments, the system 100 can provide uniform solutions for one or more of the following use-cases:
 (1) Online indexing—stream read the changes and apply changes to an eventually consistent index;
 (2) Batch-Analytics—process the changes to an account within a specific time duration;
 (3) Archival and Auditing—preserve changes to the account over a period of time (e.g., many years) for auditing and/or compliance purposes;
 (4) React to changes—Apply derivative processing on objects created/changed for event-driven architectures In some embodiments, the system 100 can provide a low-cost, low-cogs solution for both customers and the service owner (cloud platform 110). In some embodiments, the system 100 can provide a modular solution, where richer functionality can be built as richer client-side applications. In some embodiments, the system 100 can provide an uniform storage solution where the storage is provided as standard objects from the object storage service and the retention-lifetime and access is controlled by the user. In some embodiments, the system 100 can be designed to be scalable to handle any mutation rate for an account. In some embodiments, changes can be indexed coarsely into time segments (e.g., of one hour) to provide an approximate time-index.

In some embodiments, the system 100 can provide a 'ChangeFeed' (e.g., generated by the change feed component 140) which is logically an immutable read-only append-only log of accruing changes to the objects in an account. The log can be segmented by time, where each segment is a time period (e.g., an hour) worth of changes—when the changes happened. The log data files can be arranged in a simple linear/chain structure of storage objects. In this manner, complexities of topological orders of internal dynamic partitioning can be hidden away (e.g., from view of the user).

In some embodiments, the log records can be stored in standard blob object storage in the user's account. This can be written by the system 100 on-behalf-of the user. In some embodiments, the user can opt into the feature and, if so, changes are accrued into the ChangeFeed (e.g., stored by the change feed component 140).

In some embodiments, the log of changes can be durable and read-only with lifetime and/or access controlled by the owner. In some embodiments, changes can be ordered per-key and the log is stably accrued. An application can iterate through the log in a stable manner by remembering the last position accessed.

In some embodiments, changes appear exactly-once in the data logs. In this manner, applications can be written in a simple manner to be correct.

In some embodiments, there can be an index of the time segments. The customer can list the time segments and determine which time segments are present and which ones to read. The time-segment can have a manifest (e.g., table) of where the data log object blobs are located.

In some embodiments, the change records are appended into the object blobs using standard Avro format. Each data log can be consumed independently across time as the schema for the lifetime of that blob is encoded in the blob itself.

In some embodiments, logs are accrued in real-time. Records are appended and read in real-time. In this manner, streaming applications can tail the data blobs. In some embodiments, Batch processing applications can list the blobs and target them to big-data processing systems. Long-time archival needs can use object storage provided mechanisms to tier down the data blobs automatically.

In some embodiments, the data blobs are arranged as shardable (e.g., horizontally partitionable). This can be changed dynamically by the system to absorb changing mutation change rate for the account over time without causing throughput issues. In some embodiments, the number of shards can be deterministically presented to the customer applications to read.

In some embodiments, logs are immutable and consumers can operate independently and asynchronously. In some embodiments, records appear exactly once, are immutable, and/or read only. In some embodiments, a client can implement an iterator over ordered log of records deterministically.

In some embodiments, user(s) can use standard object storage list and "get" APIs to consume the data blobs. Records can be accessed and consumed using standard object storage of file-system APIs without a need of additional API surface.

"ChangeLog" Append Only Storage Primitive

Figure 2:
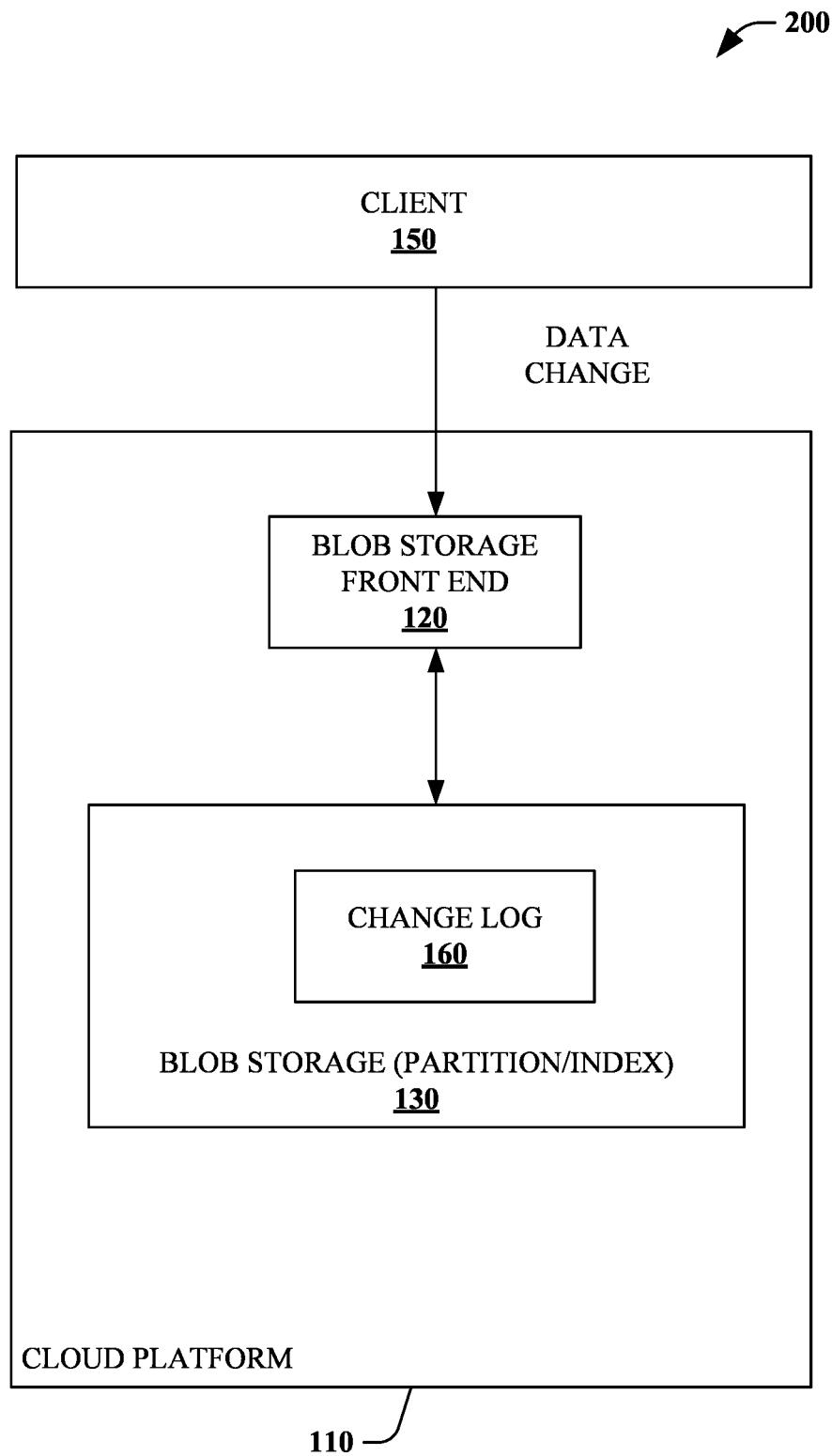
FIG. 2 is a functional block diagram that illustrates a system utilizing a change log append only storage primitive.

Referring to FIG. 2, a system 200 utilizing a change log append only storage primitive is illustrated. In some embodiments, the system 200 can employ a storage primitive (e.g., interface) "changelog" which is an append-only storage primitive for the primary purpose of capturing transactional changes or mutations in a scalable, partitioned, key-value store which uses log-structured merge-tree ("LSM-tree") as a storage engine.

The primitive has the comprehensive design of capturing change exactly-once, transactional ordering per-key across splits and merges and highly-efficient garbage-collection etc. This can form the primitive of the blob storage change-tracking which can power an event change signal and/or a change feed (as described above). In some embodiments, this primitive can be employed by other application(s), for example, change notifications for big data analytics, tags indexing, system-maintenance operations, account-level object replication, account restore, etc.

In some embodiments, a large-scale distributed key-value store forms the basis of the index of systems like a large-scale blob storage etc. Change and mutations happen in the key-value store transactionally. A storage primitive designed to capture these changes, transactionally, in an exactly-once manner, and in a scalable manner is thus highly beneficial. A reliable 'log of changes' (change log 160) forms the basis of building subsequent event-driven systems which 'act and modify' the system. The "changelog" storage primitive allows subsequent systems like indexing and/or system-maintenance operations to be built with simplicity and correctness.

In some embodiments, the "changelog" storage primitive provides for an immutable, append-only LSM-tree-based storage for log of changes (change log 160). The "changelog" storage primitive can facilitate transactional, exactly-once mechanism(s) to capture 'transactional mutations' to the key-value rows. The "changelog" storage primitive can facilitate ordering of mutations per-key. The "changelog" primitive can further facilitate a lightweight mechanism for appending the change record to the append-only store with minimal impact to the user key-value transaction.

In some embodiments, the "changelog" storage primitive facilitates a deterministically readable using ordered cursor. The "changelog" storage primitive is high scalability using a distributed log which matches the key-range partitioning of the key-value store. Thereby the "changelog" storage primitive provides scalability in the same dimension of the primary key-value store partitioning. Primitives can be used to determine order of changes in the presence of dynamic splits and merges of key-ranges in the key-value store.

In some embodiments, the "changelog" storage primitive facilitates an append-only store that can indexed at the prefix of the owning key-range (e.g., account for multi-tenant purposes, scope can be any resolution of the prefix of the key). There can be the ability to have more than one log of changes for a specific key-range.

In some embodiments, the "changelog" storage primitive efficient garbage collection by exploiting the temporal nature of the log and LSM storage to clean up old portions of the log with almost zero-impact.

Key-Value Storage Environment

A key-value store is a storage for a set of rows, sorted by some ordering of a key. In a large-scale distributed key-value store, the key-range is partitioned to be scaled across independent resources. The transactional volume of changes can be managed by the key-value store by dynamically adjusting the key-range splits and merges over time. A 'change or a mutation' is any transaction which creates, updates, and/or deletes the data and/or metadata in the key-value store by 'key'. The change is associated to a 'key'. Reads are not changes.

The system 200, and, more specifically the blob storage front end 120, can employ one or more storage engines. The storage engines can be used to logically store the sorted rows within a key-range scope. One such engine is an LSM-tree which is write-efficient. An LSM tree has an ordered merge-sets of rows and provides efficient lookup of rows by using different means.

In some embodiments, the append-only storage for the changelog primitive has to logically fit the primary partitioning scheme to be able to scalable in the distributed large-scale store. The append-only storage has to be efficient to work within the norms of an LSM-tree engine.

In some embodiments, the system 200 includes an ability to compose and/or consume the changelog 'scoped' to only a prefix of the key range. For example, the system 100 may need to collect and consume changes by an Account efficiently, where Account is a prefix-part of the key.

In some embodiments, the changelog is designed to hold small records which are meant to hold metadata and reference about the change, and not the changed data itself. This makes it amenable to use for uniform uses like in blob storages to any generic key-value purpose.

Logical Design

In some embodiments, the 'changelog' (change log 160) is designed as a distributed log. It is partitioned on the same key-range scheme of the key-value store with each partition of the 'changelog' called a 'segment'.

In some embodiments, each record in the partition of the changelog can be keyed by the a) low-key of the partition and b) some identifier of the partition instance.

In some embodiments, changes which occur during the lifetime of the partition get inserted into the segment as a 'record' in an append-only log. The log of changes is immutable. For the active lifetime of the partition, changes are appended into the 'live' segment. In the event of dynamic splits and merges, the immutable segment of changes becomes 'passive', for example, no more records will be added and move naturally along with the low-key of the partition. After a split or merge, the new partitions will start new 'live' segments with their specific low-keys.

In some embodiments, when a partition splits/merges dynamically, the set of live and passive segments form a natural topological order. This order is required for total ordering of changes (per-key). For this, a topological monotonic-order clock can be introduced for the lifetime of a partition, which ticks when the partitions go through splits and merges. This clock is a part of the 'key of the changelog segment'.

In some embodiments, the system 200 employs an index of segments which is created when new segments are created. To topologically order the segments to determine the total order, the segments are queried from the index and a silhouette algorithm can be used to determine the overlapping predecessors of any key-range. This provides the topological order of segments to process to maintain total ordering of changes per-key.

Exemplary ChangeLog Record & Append-Only Storage

An exemplary ChangeLog record is illustrated in Table 1:

TABLE 1

* Logical ChangeLog Record Schema :
  * [KEY] SegmentKey: { Low-Key Of Partition, Partition Identifier, Partition Epoch, SegmentScope }
  * [KEY] Transaction Sequence Number: { Epoch, CommitTimestamp, Sequence }

TABLE 1-continued

* Changed Key
* Change Details Metadata

In some embodiments, a ChangeLog can be naturally generated and unique for a lifetime of a partition. However, different ChangeLog buckets can be created using 'scope' for a lifetime of a Partition. Additionally, in some embodiments, there can be only one record per Transaction keyed by the transaction sequence number. The sequence numbers form a natural append-only key into the Change Lo Append-Only Storage.

Partition Split/Merge Example

An example split/merge is provided in Table 2: Given:

TABLE 2

- Key-Prefixes in Partition 0 = { a, b, c, d, e } ( key-range : [a-f) )
- Split-Key is somewhere in Account c - 'c/container-1/blob-32'
- Invariant : All keys are unique in the table space.
- After Split, Key-Prefixes in Partition-1 = { a, b, c }, Key-Prefixes In Partition-2 = { c, d, e }.
- SegmentKeys for A ( after split - assuming had change events before and after split )
- Partition-1 => [ a/null/P0, a/null/P1 ] ( 2 segments )
- SegmentKeys for C ( after split - assuming c had change events before and after split)
- Partition-1 => [ c/null/P0, c/null/P1 ] ( 2 segments )
- Partition-2 => [ c/container-1/blob-32/P2 ] ( 1 segment )

Figure 3:
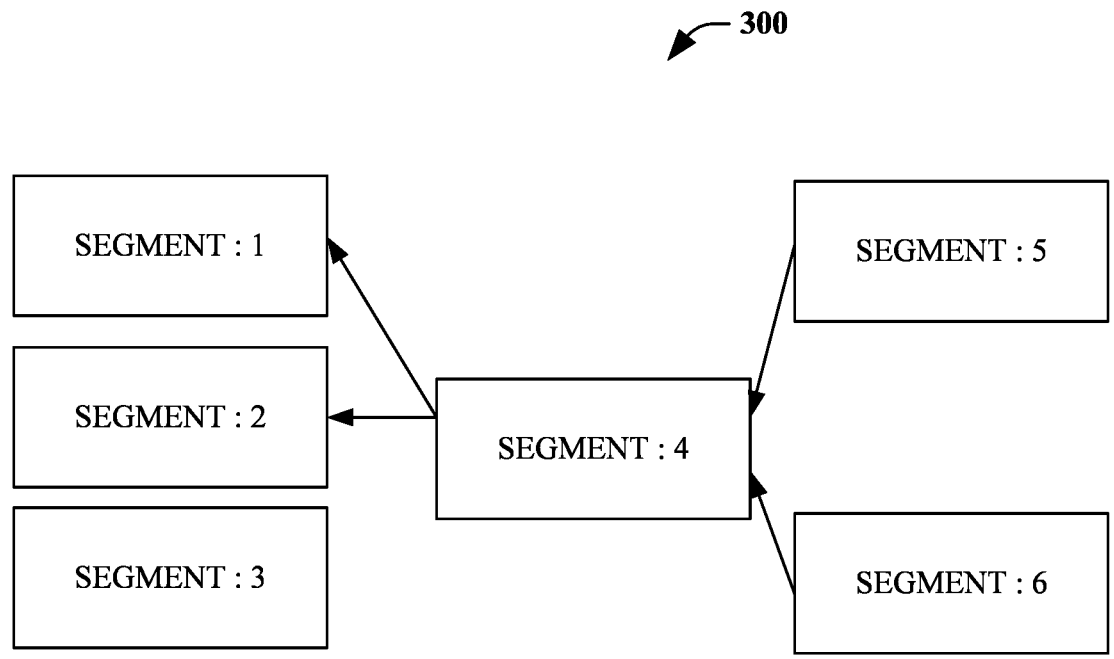
FIG. 3 is a diagram that illustrates an exemplary Account over time.

FIG. 3 is a diagram 300 that illustrates an exemplary Account over time, as forth in Table 3:

TABLE 3

T0 : P1[a-k][S1:60], P2:[k-m][S2:1000], P3:[m-z][S3:80]
T1 : <split P2>
  : P1:[a-k][S1:60], P2:[k-l][S2:1000,S4:30], P4:[l-m][S5:50], P3:[m-z][S3:80]
T2 : <merge P4,P3>
  : P1:[a-k][S1:60], P2:[k-l][S2:1000,S4:30], P5:[l-z][S3:80, S5:50, S6:10]

In some embodiments, a Segment-Index is a key-value table which stores the segment-keys. The segment-index can be naturally distributed using the same partitioning scheme as the primary store and all operations are local. When a new segment is created, an idempotent record for the segment can be added optimistically without any overhead. In the event of loss of the segment-index table, the segment-index can be re-created by 'hopscanning' the changelog in the event of extreme cases.

In some embodiments, application(s) can process records from the ChangeLog independently and asynchronously. The changelog segments are immutable. ChangeLog segments can be determined by querying a 'segment-index' which has all the 'segment-keys'. The query for the segments can be limited by 'Scope' The changelog is iterated in part or full by using the segment-key the sequence cursor position. Applications can keep their own checkpoint state.

Exemplary Physical Design of ChangeLog

In some embodiments, the changelog is naturally composed as an LSM-tree. Since the changes are temporally ordered, the structure of the levels of the LSM-tree blocks mirror the temporal order of creation of the records in the log.

Writes are natural to the LSM-tree operation. After the commit-record has been persisted for a transaction, the record is added to the memory-index (R-B Tree) level of the LSM-tree. Since the key is derived from the sequence number, the order in the R-B tree is naturally appended.

When the memory-index is checkpointed to a sorted-file, the order remains same and the levels become naturally temporally ordered.

Records are not random looked-up by key, but rather read as sequential log of changes. Any record can be looked up by key normally using the LSM-tree structure. (The key of the record is the segmentkey and the sequence number of the change). The sequential iteration can be started from that point.

Reads within an LSM-tree are efficient, needing to lookup lower levels only when the last record in the previous level is moved past. This is cache efficient too.

In some embodiments, there are no mutations or deletions of individual records as the log segments are logically immutable. Since the levels of the LSM-tree are naturally temporally ordered, old changes are removed or garage collected by simply truncating files which correspond to old levels. This makes it extremely efficient for collection.

Exemplary LSM tree levels (Storage within a Partition/Key-Range) are set forth in Table 6:

TABLE 6

(natural append key : transaction sequence number derived)
Memory-Index : [ ... ] <- Appended to the end of the memory-index
Level [n] : [ {immutable set of records }]
Level [n-1] : [ {immutable set of records }]
...

With respect to garbage collection, rows are not deleted individually, tables are immutable (read-only). FileTables are created which have natural time-ordering of records within them. The system 200 can employ a strategy to minimize file-table-merges of change-log file-tables and harvest them in using time-based policy. In some embodiments, the system 200 can be careful not to delete ones which contain records for which notifications have been delayed for some reason.

The system 200 can append a record during a transaction with minimal overhead. The changelog record is prepared with the details of the transaction during the prepare phase. The changelog record is written to the durable transaction redo log along with the other data records for the transaction without the need for additional durable write IO. The changelog record is added to the memory-index-state after commit record has been successfully written using an ephemeral serialized 'commit-timestamp', thereby immediately available in stable order after transaction has been committed (or does not exist if aborted).

Upon crash-recovery, the commit-timestamp is assumed to be MAX, and the order is based on {Epoch, Sequence}, which is still the true order of the changes per-key.

An algorithm using the highest-completed-sequence in the memory-index can be used to determine conservative checkpoint to read/process the records without missing any, in the event of crash recovery. After reading, a stable order, if required, can be obtained by sorting by {Epoch, Sequence} and using the highest-completed-sequence.

One changelog record can be inserted per transaction per scope. In some embodiments, the system 400 can have multiple scopes if needed (e.g., per partition, per account, etc.).

Exactly-Once Publishing of Ordered Records

Figure 4:
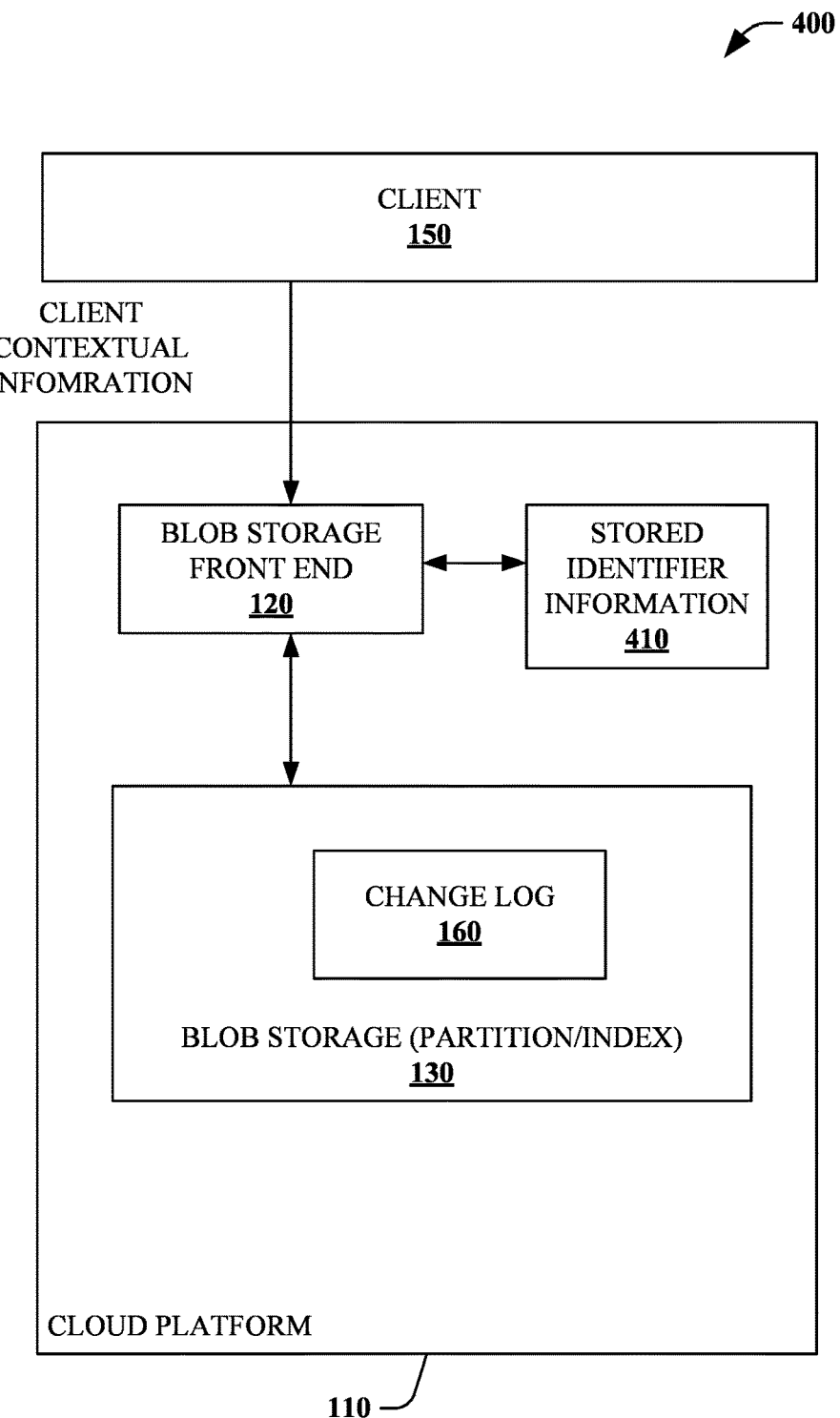
FIG. 4 is a functional block diagram that illustrates an append-only block-oriented object storage system.

Referring to FIG. 4, an append-only block-oriented object storage system 400 is illustrated. Append-only block-oriented object storage primitives provided by cloud storage services provide an API to append blocks of data atomically. They may provide conditional-update based on server-side information as the last-offset. Due to the nature of reality, there can be deterministic and non-deterministic failures while trying to append a block of data, that is, if a failure happens, you are not sure whether the block was appended or not without additional information.

A distributed set of publishers can desire to publish an ordered set of 'records' exactly-once using such an append only block-oriented storage primitive provided by cloud storage solutions. To replicate data-streams in an exactly-once, correct and reliable manner, the following problems arise in the presence of failure (deterministic or non-deterministic).

First, even in the presence of a single-publisher, the last-byte conditional offset is a server-side 'result' value. The publisher cannot relate this context to the publisher's data position (e.g., record sequence number, etc.). In the event of a failure, the publisher will have to read the last few bytes, deserialize them and determine the context in data stream. This is inefficient and also in the extreme cases, the publisher (client) may need to deserialize the entire persisted stream if there is insufficient information to parse the tail of the stream. Even in cases of a correct append operation, there is no relation to the publisher's context and the server's result last appended byte-offset.

Second, in the presence of multiple concurrent and distributed publishers, publishers will have no way to determine what the last 'context' that was successfully appended by that specific publisher. Hence there is no way for the publisher to append his context exactly-once unless the publisher re-reads the entire stream from the beginning to determine his position.

Described herein is a system and method in which additional context can be provided by the append-only block oriented storage primitive, which makes implementing of exactly-once append of data streams from distributed publisher(s) correct and efficient. This mechanism is fundamental and extends beyond the scope of the publishing of 'record' streams. Any distributed set of publishers can use this to append any data-streams with using publisher-wise-contexts for the data-streams.

Client-Context-Conditional-Append

When the client appends a block of data from his stream, the client provides 'client contextual information'. This 'client contextual information' is used by the server-side/cloud append-only block oriented storage primitive for conditional atomic append of the block (component of the blob storage front end 120). The service also stores this 'client-contextual-information' (in a stored identifier information 410) against an identifier (e.g., which uniquely identifies the client/publisher) provided by the 'publisher' to uniquely identify the stream. In some embodiments, the stored identifier information 410 stores an identifier of the most recently appended block for each of a plurality of clients with each client identified by a universally unique identifier.

Table 7 provides exemplary information from a client, and, performed by a server:

TABLE 7

Client-1 --> Write Request : [ AppendBlock, {data}, {client-1-id : my clientcontext}]
  Server => atomic append : [ if client-1-id.client-context == x, then append the block, update the client-context to y ]

With respect to the example of Table 7, the identifier provided by client "my-client-context" is an identifier that of most recently appended block from the particular client. Only if the identifier provided by the client matches the identifier stored on the server for the particular client (based upon the universally unique identifier), the server perform an atomic append. The server can then update the stored identifier based upon the received client context and/or received block of data (e.g., record sequence number of the client).

The identifier allowed for a publisher is a universally unique identifier (UUID) and the publishers can choose to pick several ways to identify themselves uniquely with and/or without any coordination amongst themselves thereby allowing practical solutions.

Figure 5:
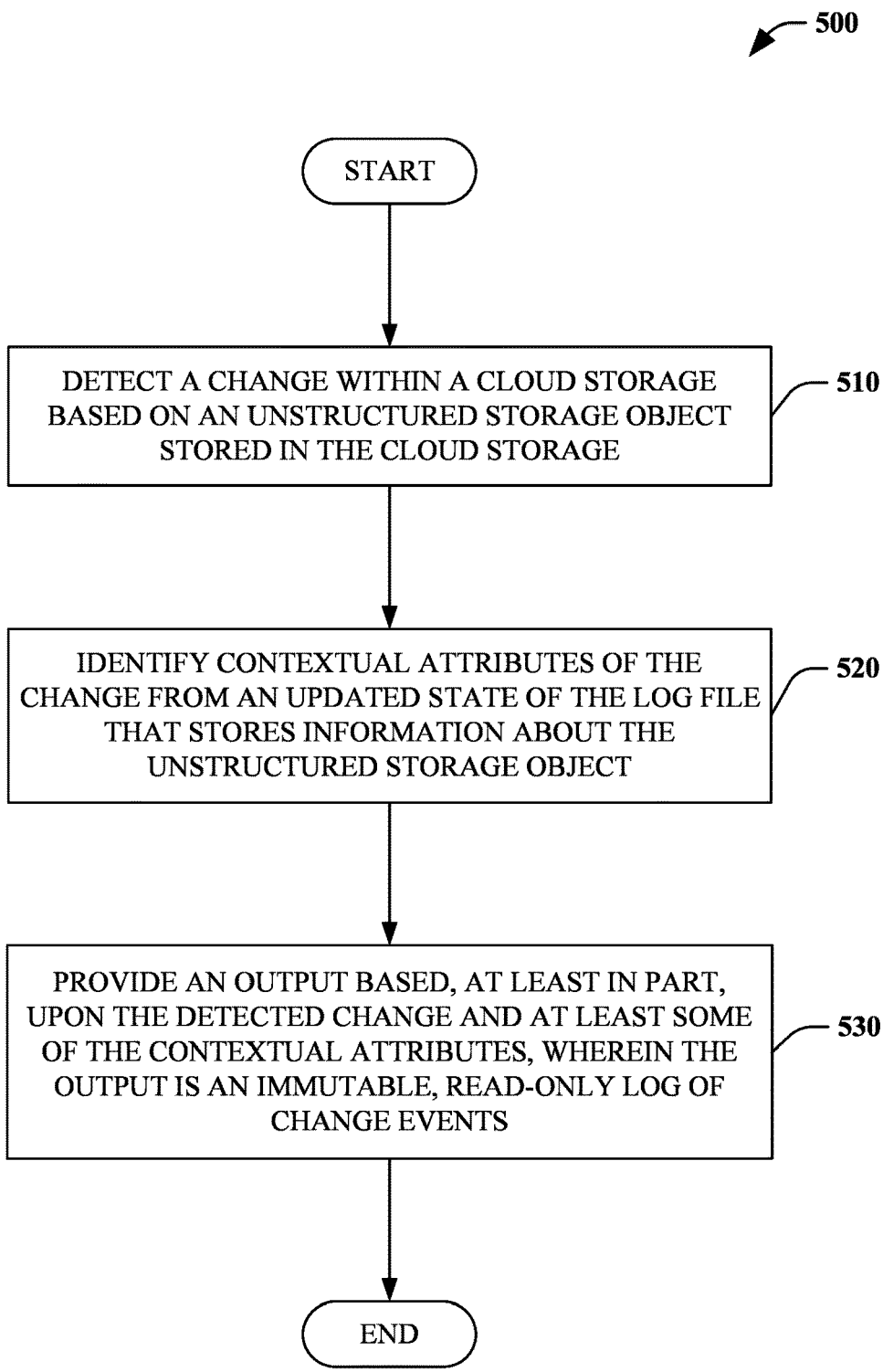
FIG. 5 is a flow chart that illustrates a method of providing user accessible log of object storage change-events.
Figure 6:
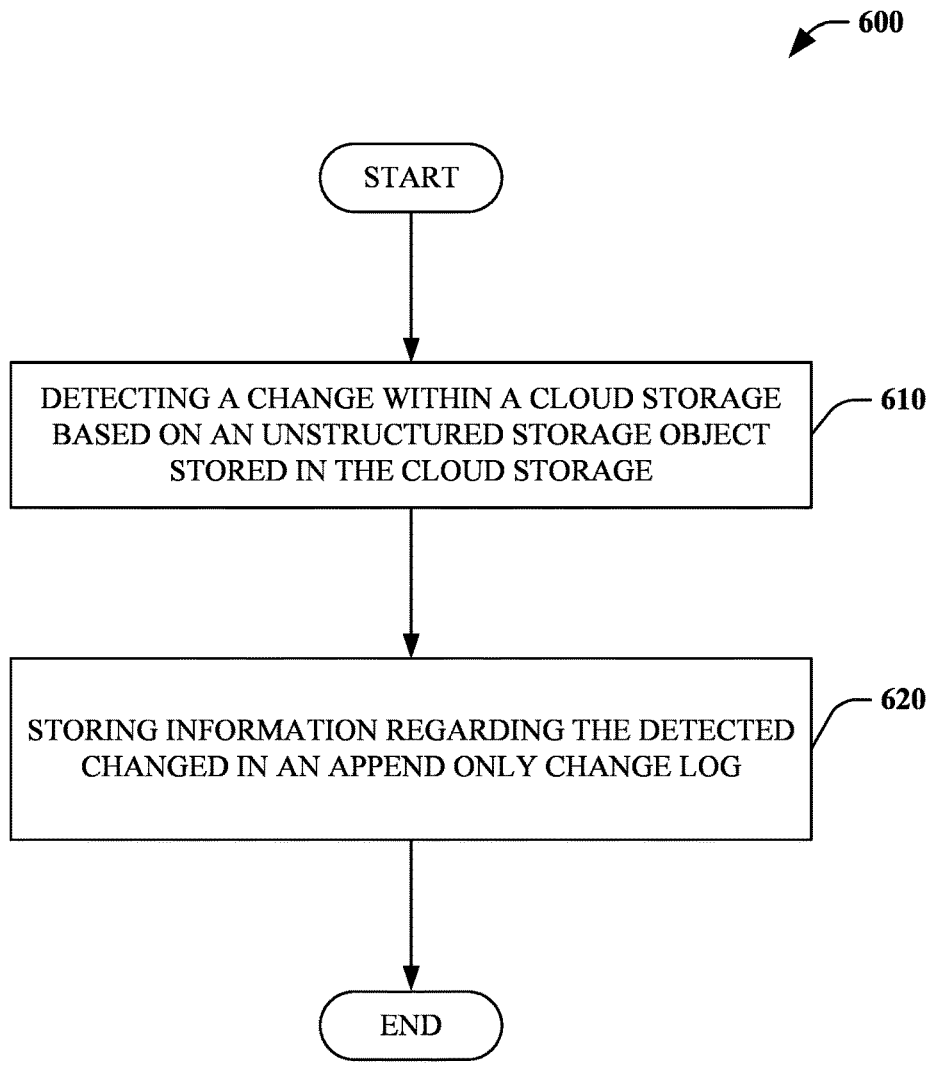
FIG. 6 is a flow chart that illustrates a method of utilizing a change log append only storage primitive.
Figure 7:
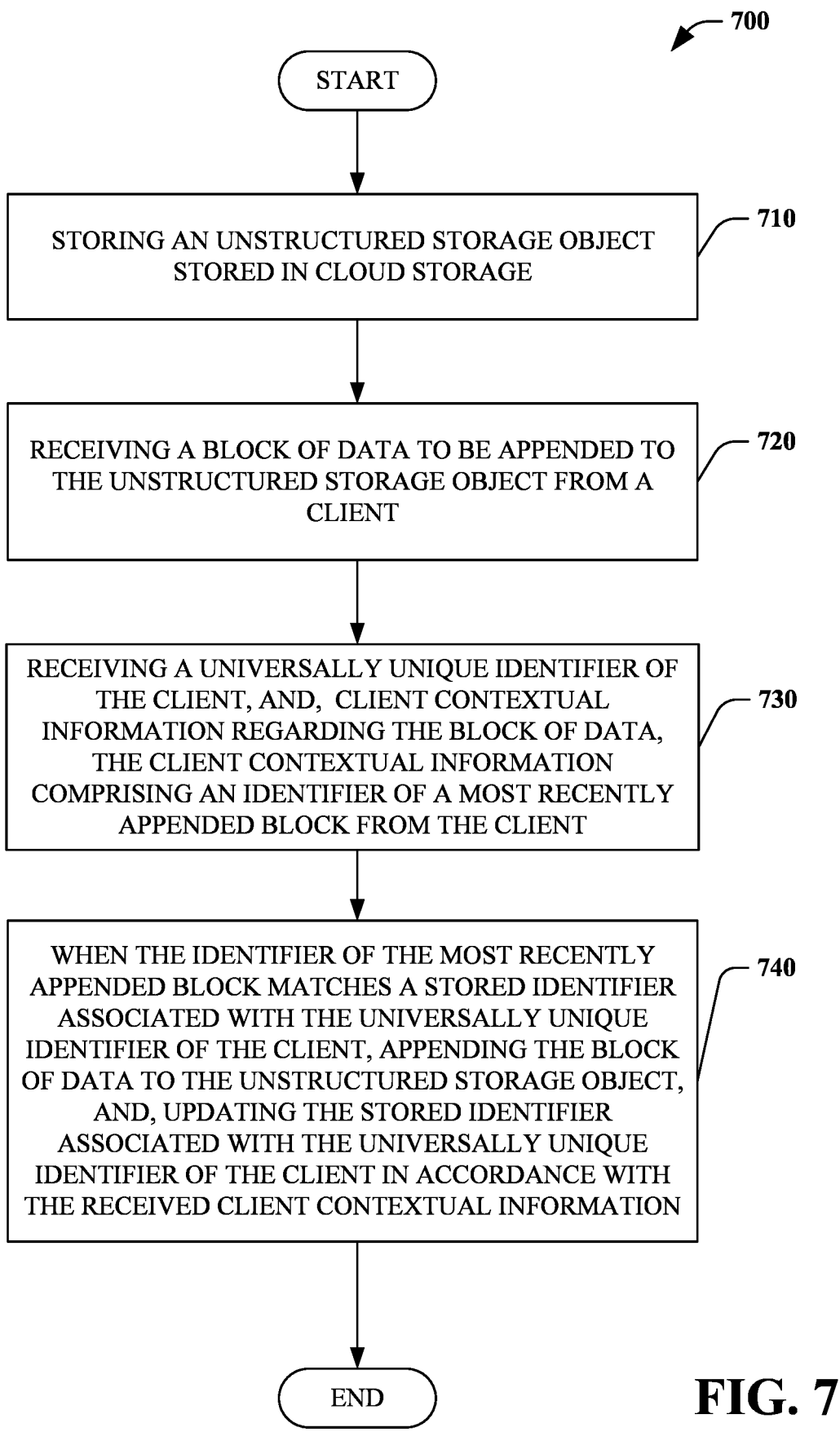
FIG. 7 is a flow chart that illustrates a method of an append-only block-oriented object storage system.

FIGS. 5-7 illustrate exemplary methodologies relating to object storage change-events. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method 500 of providing user accessible log of object storage change-events is illustrated. In some embodiments, the method 500 is performed by the system 100.

At 510, a change within a cloud storage based on an unstructured storage object stored in the cloud storage is detected. At 520, contextual attributes of the change are identified from an updated state of the log file that stores information about the unstructured storage object. At 530, an output is provided based, at least in part, upon the detected change and at least some of the contextual attributes, wherein the output is an immutable, read-only log of change events.

Turning to FIG. 6, a method 600 of utilizing a change log append only storage primitive is illustrated. In some embodiments, the method 600 is performed by the system 100.

At 610, a change within a cloud storage based on an unstructured storage object stored in the cloud storage is detected. At 620, information regarding the detected changed is stored in an append only change log.

Next, referring to FIG. 7, a method 700 of an append-only block-oriented object storage system is illustrated. In some embodiments, the method 700 is performed by the system 400.

At 710, an unstructured storage object is stored in cloud storage. At 720, a block of data to be appended to the unstructured storage object from a client is received.

At 730, a universally unique identifier of the client, and, client contextual information regarding the block of data is received. The client contextual information comprises an identifier of a most recently appended block from the client. At 740, when the identifier of the most recently appended block from the client matches a stored identifier associated with the universally unique identifier of the client, the block of data to the unstructured storage object is updated, and, the stored identifier associated with the universally unique identifier of the client is updated in accordance with the received client contextual information.

Described herein is a system for a user accessible log of object storage change-events system, comprising: a computer comprising a processor and a memory having computer-executable instructions stored thereupon which, when executed by the processor, cause the computer to: detect a change within a cloud storage based on an unstructured storage object stored in the cloud storage; identify contextual attributes of the change from an updated state of the log file that stores information about the unstructured storage object; providing an output based, at least in part, upon the detected change and at least some of the contextual attributes, wherein the output is an immutable, read-only log of change events.

The system can further include wherein the change is detected based upon at least one of creation of the unstructured storage object, modification of the unstructured storage object, or, deletion of the unstructured storage object. The system can further include wherein the change is stored as an event which identifies at least one of a location of the unstructured storage object within the cloud storage, or, an account associated with the unstructured storage object. The system can further include wherein the change is stored as an event which identifies at least one of a timestamp of the change, metadata of the change, or, a context of the change.

The system can further include wherein the contextual attributes identify at least one of a type of change, an account associated with the change, or, a user associated with the change. The system can further include wherein the contextual attributes identify at least one of an updated storage location of the unstructured storage object within the cloud storage, or, a chronological order of the change with respect to other changes. The system can further include wherein the output is provided based upon the detected change. The system can further include wherein the output is provided based upon a plurality of detected changes.

Described herein is a method of utilizing a change log append only storage primitive, comprising: detecting a change within a cloud storage based on an unstructured storage object stored in the cloud storage; and storing information regarding the detected changed in an append only change log.

The method can further include wherein the append only change long is a partitioned, key-value store which uses a log-structured merge-tree. The method can further include performing garbage collection by truncating files which correspond to old levels. The method can further include wherein the append only change log captures changes in an exactly-once, transactional ordering.

The method can further include wherein the append only change log is a distributed log. The method can further include wherein the distributed log is partitioned on a key-range scheme.

Described herein is a computer storage media storing computer-readable instructions that when executed cause a computing device to: store an unstructured storage object stored in cloud storage; receive a block of data to be append to the unstructured storage object from a client; receive a universally unique identifier of the client, and, client contextual information regarding the block of data, the client contextual information comprising an identifier of a most recently appended block from the client; and when the identifier of the most recently appended block from the client matches a stored identifier associated with the universally unique identifier of the client, append the block of data to the unstructured storage object, and, updating the stored identifier associated with the universally unique identifier of the client in accordance with the received client contextual information.

The computer storage media can further include wherein identifiers of the most recently appended block are stored for each of a plurality of clients. The computer storage media can further include wherein the identifiers of the most recently appended block are stored with universally unique identifiers of each of the plurality of clients. The computer storage media can further include wherein the block of data is appended in an atomic append.

The computer storage media can further include wherein the received client contextual information further comprises a record sequence number of the client. The computer storage media can further include wherein the stored identifier is updated based upon the record sequence number.

Figure 8:
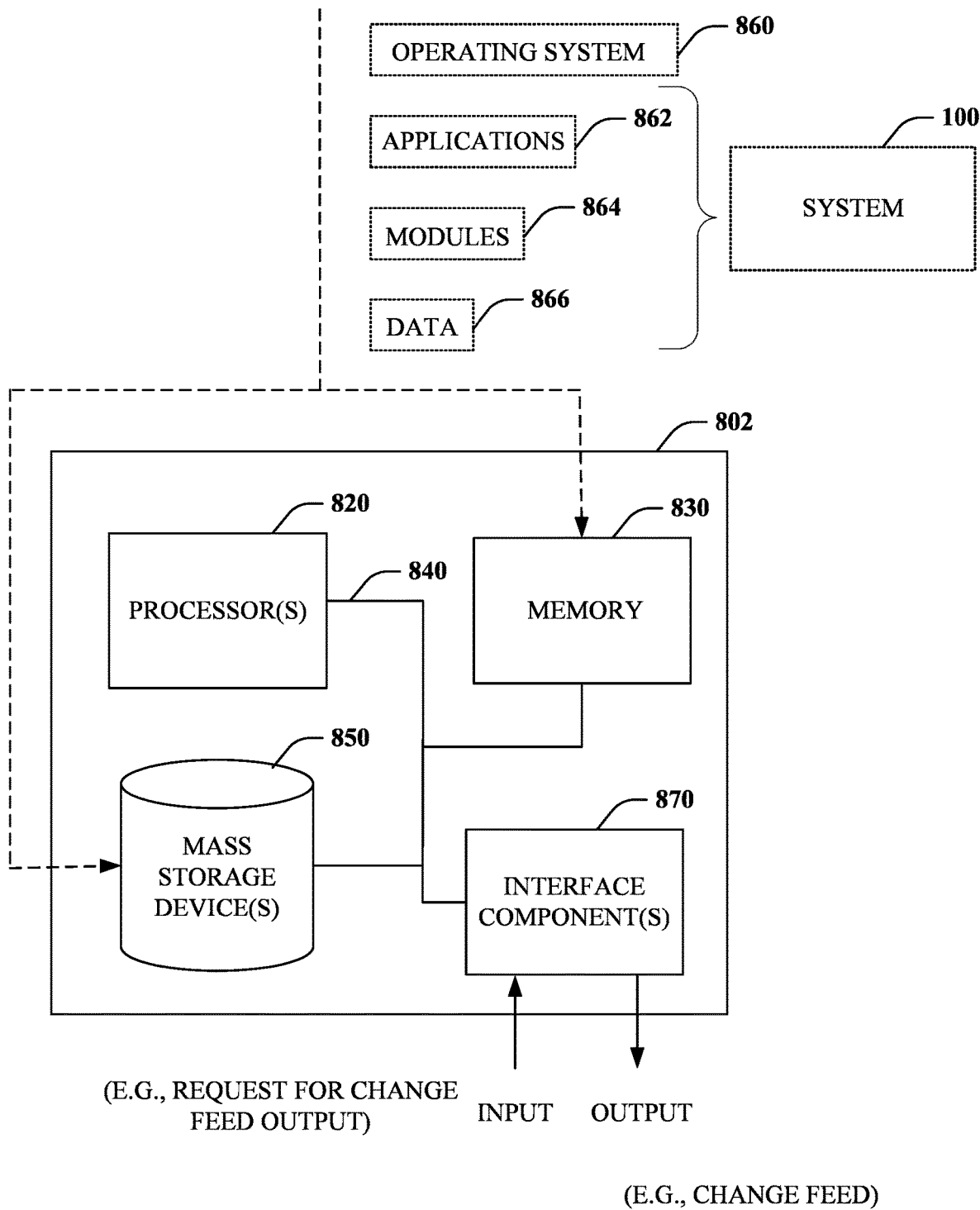
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a user accessible log of object storage change-events system 100, a system 200 utilizing a change log append only storage primitive, and/or an append-only block-oriented object storage system 400.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device(s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In some embodiments, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which, when executed by the processor, cause the system to:
   store an unstructured storage object in cloud storage;
   receive, from a client, a block of data to append to the unstructured storage object;
   receive a universally unique identifier of the client, and client contextual information regarding the block of data, the client contextual information comprising an identifier of a most recently appended block from the client; and
   when the identifier of the most recently appended block from the client matches a stored identifier associated with the universally unique identifier of the client, append the block of data to the unstructured storage object and update the stored identifier associated with the universally unique identifier of the client in accordance with the received client contextual information, wherein,
   identifiers of the most recently appended block are stored for each of a plurality of clients, and
   each of the plurality of clients chooses its own universally unique identifier without coordination with others of the plurality of clients.

2. The system of claim 1, wherein the identifiers of the most recently appended block are stored with universally unique identifiers of each of the plurality of clients.

3. The system of claim 1, wherein the block of data is appended in an atomic append.

4. The system of claim 1, wherein the received client contextual information further comprises a record sequence number of the client.

5. The system of claim 4, wherein the stored identifier is updated based upon the record sequence number.

6. A method, comprising:
   storing an unstructured storage object in cloud storage;
   receiving, from a client, a block of data to append to the unstructured storage object;
   receiving a universally unique identifier of the client, and client contextual information regarding the block of data, the client contextual information comprising an identifier of a most recently appended block from the client; and
   when the identifier of the most recently appended block from the client matches a stored identifier associated with the universally unique identifier of the client, appending the block of data to the unstructured storage object and updating the stored identifier associated with the universally unique identifier of the client in accordance with the received client contextual information, wherein,
   identifiers of the most recently appended block are stored for each of a plurality of clients, and
   each of the plurality of clients chooses its own universally unique identifier without coordination with others of the plurality of clients.

7. The method of claim 6, wherein the identifiers of the most recently appended block are stored with universally unique identifiers of each of the plurality of clients.

8. The method of claim 6, wherein the block of data is appended in an atomic append.

9. The method of claim 6, wherein the received client contextual information further comprises a record sequence number of the client.

10. The method of claim 9, wherein the stored identifier is updated based upon the record sequence number.

11. A computer-readable storage medium, excluding signals, that stores computer-readable instructions that, when executed by a processor of a computing device, cause the computing device to:

store an unstructured storage object in cloud storage;

receive, from a client, a block of data to append to the unstructured storage object;

receive a universally unique identifier of the client, and client contextual information regarding the block of data, the client contextual information comprising an identifier of a most recently appended block from the client; and when the identifier of the most recently appended block from the client matches a stored identifier associated with the universally unique identifier of the client, append the block of data to the unstructured storage object and update the stored identifier associated with the universally unique identifier of the client in accordance with the received client contextual information, wherein, identifiers of the most recently appended block are stored for each of a plurality of clients, and each of the plurality of clients chooses its own universally unique identifier without coordination with others of the plurality of clients.

12. The computer-readable storage medium of claim 11, wherein the identifiers of the most recently appended block are stored with universally unique identifiers of each of the plurality of clients.

13. The computer-readable storage medium of claim 11, wherein the block of data is appended in an atomic append.

14. The computer-readable storage medium of claim 11, wherein the received client contextual information further comprises a record sequence number of the client.

15. The computer-readable storage medium of claim 14, wherein the stored identifier is updated based upon the record sequence number.

* * * * *